(12) United States Patent
Anderson

(10) Patent No.: US 12,388,900 B2
(45) Date of Patent: *Aug. 12, 2025

(54) UNIVERSAL SESSION PROTOCOL

(71) Applicant: Jonathon Anderson, Oswego, IL (US)

(72) Inventor: Jonathon Anderson, Oswego, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/432,848

(22) Filed: Feb. 5, 2024

(65) Prior Publication Data

US 2024/0179216 A1 May 30, 2024

Related U.S. Application Data

(63) Continuation of application No. 18/219,386, filed on Jul. 7, 2023, now Pat. No. 11,895,198.

(60) Provisional application No. 63/420,417, filed on Oct. 28, 2022.

(51) Int. Cl.
| | |
|---|---|
| *H04L 67/146* | (2022.01) |
| *H04L 9/32* | (2006.01) |
| *H04L 67/141* | (2022.01) |

(52) U.S. Cl.
CPC .......... *H04L 67/146* (2013.01); *H04L 9/3213* (2013.01); *H04L 67/141* (2013.01)

(58) Field of Classification Search
CPC .... H04L 67/146; H04L 9/3213; H04L 67/141
See application file for complete search history.

(56) References Cited

U.S. PATENT DOCUMENTS

| | | | |
|---|---|---|---|
| 10,110,585 B2 | 10/2018 | Ghafourifar et al. | |
| 10,205,803 B1* | 2/2019 | Sharifi Mehr | H04L 43/06 |
| 10,771,435 B2 | 9/2020 | Goldschlag et al. | |
| 11,159,511 B1* | 10/2021 | Geusz | H04L 63/102 |
| 11,411,958 B2 | 8/2022 | Pularikkal et al. | |
| 11,470,100 B1 | 10/2022 | Christian | |
| 11,496,461 B2 | 11/2022 | Tokuma et al. | |
| 2003/0043991 A1 | 3/2003 | Kriechbaum et al. | |
| 2006/0085862 A1 | 4/2006 | Witt et al. | |
| 2009/0210707 A1 | 8/2009 | De Lutiis et al. | |
| 2012/0060210 A1* | 3/2012 | Baker | H04L 63/0807 726/5 |
| 2014/0279358 A1* | 9/2014 | Rosenberg | G06Q 40/04 705/37 |
| 2015/0032863 A1* | 1/2015 | Sinha | H04L 65/1104 709/220 |
| 2016/0140663 A1 | 5/2016 | Greenberg et al. | |

(Continued)

OTHER PUBLICATIONS

Decusatis et al., Implementing Zero Trust Cloud Networks with Transport Access Control and First Packet Authentication, 2016 IEEE International Conference on Smart Cloud (SmartCloud), Nov. 18, 2016.

(Continued)

*Primary Examiner* — Brian J. Gillis
*Assistant Examiner* — Thao D Duong
(74) *Attorney, Agent, or Firm* — UB Greensfelder LLP; Benjamin D. Rotman

(57) ABSTRACT

The invention comprises a universal session protocol configured to initiate, authenticate, and manage the session of an application data stream. The universal session protocol governs the interaction between sending applications and sending agents as well as receiving applications and receiving agents to establish authenticated data streams between applications or systems.

5 Claims, 9 Drawing Sheets

(56) References Cited

U.S. PATENT DOCUMENTS

| | | | |
|---|---|---|---|
| 2016/0358108 A1* | 12/2016 | Sadovsky | G06Q 10/02 |
| 2017/0063946 A1 | 3/2017 | Quan et al. | |
| 2019/0238546 A1 | 8/2019 | Petersen et al. | |
| 2020/0027470 A1* | 1/2020 | Thurman | H04R 3/12 |
| 2021/0306320 A1* | 9/2021 | Squire | H04W 12/084 |
| 2022/0014553 A1 | 1/2022 | Dutta | |
| 2022/0029842 A1* | 1/2022 | Onoue | H04L 51/04 |
| 2022/0058037 A1* | 2/2022 | Ye | H04L 63/08 |
| 2022/0343319 A1* | 10/2022 | Murao | H04L 67/02 |
| 2022/0345491 A1 | 10/2022 | Luo et al. | |

OTHER PUBLICATIONS

Zaheer et al., eZTrust: Network-Independent Zero-Trust Perimeterization for Microservices, Apr. 3, 2019.

Sarkar et al., Security of Zero Trust Networks in Cloud Computing: A Comparative Review, Sustainability, Sep. 7, 2022, MDPI.

Eidle et al., Autonomic Security for Zero Trust Networks, 2017 IEEE 8th Annual Ubiquitous Computing, Electronics and Mobile Communication Conference (UEMCON), Oct. 19, 2017.

* cited by examiner

```
{
    "message":"initialize", [1002]
    "authentication":["<protocol>", "<protocol>"], [1004]
    "streams": [ [1006]
        {
            "application":"<application>", [1008]
            "token":"<token>" [1010]
        }
    ]
}
```

```
{
    "message":"connect", [1102]
    "application":"<application>" [1104]
}
```

```
{
    "message":"authenticate", [1202]
    "protocol":"<protocol>" [1204]
}
```

Fig. 13
```
{
    "message":"token", [1302]
    "streams": [ [1304]
      {
         "application":"<application>", [1306]
         "token":"<token>" [1308]
      }
    ]
}
```

Fig. 14
```
{
    "message":"error", [1402]
    "error":"<text>" [1404]
}
```

UNIVERSAL SESSION PROTOCOL

CROSS-REFERENCE TO RELATED APPLICATION

The present application is a continuation of U.S. patent application Ser. No. 18/219,386, filed Jul. 7, 2023, which will issue as U.S. Pat. No. 11,895,198 on Feb. 6, 2024, which claims priority to and the benefit of U.S. Provisional Patent Application No. 63/420,417, filed Oct. 28, 2022, the contents of which are incorporated herein by reference and made a part hereof.

BACKGROUND OF THE INVENTION

The present invention generally relates to the field of data transmission through any form of data stream between a sending and receiving agent on behalf of a sending and receiving application, respectively, for the sake of initiating, authenticating, and managing a data stream to be used for the purpose of transmitting data between applications.

The current paradigm for stream session establishment puts the responsibility for initiation, authentication, and management on an application itself, rather than a dedicated procedure executed by agents that abstracts that responsibility away from the application. Two consequences of this design include (1) that applications are processing client data before having established the identity of the client, leaving any errors in program design exposed to anonymous exploitation, and (2) there is no universal standardized method of authenticating a session, so any new applications are left to reinvent the process. This is a significant vulnerability in computing because even the most secure applications must process unauthenticated user data in order to determine (1) whether authentication is necessary, (2) whether there is authentication information in the stream, and (3) whether the user would be authorized to process data in the application even if authenticated.

Vulnerabilities are exposed because applications establish data streams directly with the requesting client and begin processing application data immediately. The bytes of application data may or may not contain a malicious payload, and they may or may not contain an identity. In order for the application to determine whether an identity needs to be or can be established, it necessarily must process the received application data so that it can be analyzed for intent and identity information. Because the application data is processed, if the application data is a malicious payload, it will also be processed. If the payload was successful at targeting a vulnerability, the system is compromised.

In order to overcome the shortcoming of these prior network protocols, the present invention uses the data stream to examine strictly structured data from the requesting client to first determine whether authentication is necessary, and then to complete authentication if needed. Applications only have access to the data stream after an identity is established by the protocol, meaning that only data from known users will be processed on the system and all data that is processed will be associated with an identity.

SUMMARY OF THE INVENTION

In view of the above, a novel protocol configured to authenticate a data stream from a sending application prior to providing accesses to the application layer of the receiving application is provided herein. The objective of the inventive protocol is to process all session management needs for an application, using any type of data stream. As a requirement of the inventive protocol, applications would only have access to data streams after the protocol has determined that the client is authorized to access the application. Further, if authorization is not granted by the protocol, the protocol ensures that clients are not able to transmit data into the application.

To accomplish this objective, the protocol creates an additional discrete process that is completed before any application, using an agent component that is granted access to that stream; applications will no longer listen directly for incoming requests and client requests will instead be curated for the application by the protocol. Restricting access to data streams is possible due to rules governing what resources are in scope for the running process to access. Until the protocol completes, the data stream will not be in scope for the application, so no data may be transmitted or received across the stream into the application.

In one aspect, the protocol comprises a method of processing data when an application's agent builds and transmits a data stream comprising the steps of: client application sending an initialization request from a sending agent, receiving agent for a server application listening for the initialization request, the applications building the data stream, the second application checking for an authentication requirement, if authentication is required, the sending agent sends authentication credentials back to the receiving agent, and if authenticated successfully at the receiving agent, the data stream is allowed to enter the application layer of the receiving application.

It should be recognized by one of skill in the art that the term "computer" includes but is not limited to devices that communicate across a connected network such as servers, personal computers, smart phones, and tablets.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

FIG. 13 illustrates a token message.
FIG. 14 illustrates an error message.

Other aspects and advantages of the present invention will become apparent upon consideration of the following detailed description, wherein similar structures have similar reference numerals.

DETAILED DESCRIPTION OF THE PREFERRED EMBODIMENTS

The foregoing and other features and advantages of the invention will become more apparent from the following detailed description of an exemplary embodiment, read in conjunction with the accompanying drawings. The detailed description and drawings are merely illustrative of the invention rather than limiting, the scope of the invention being defined by the appended claims and equivalents thereof.

Figure 1:
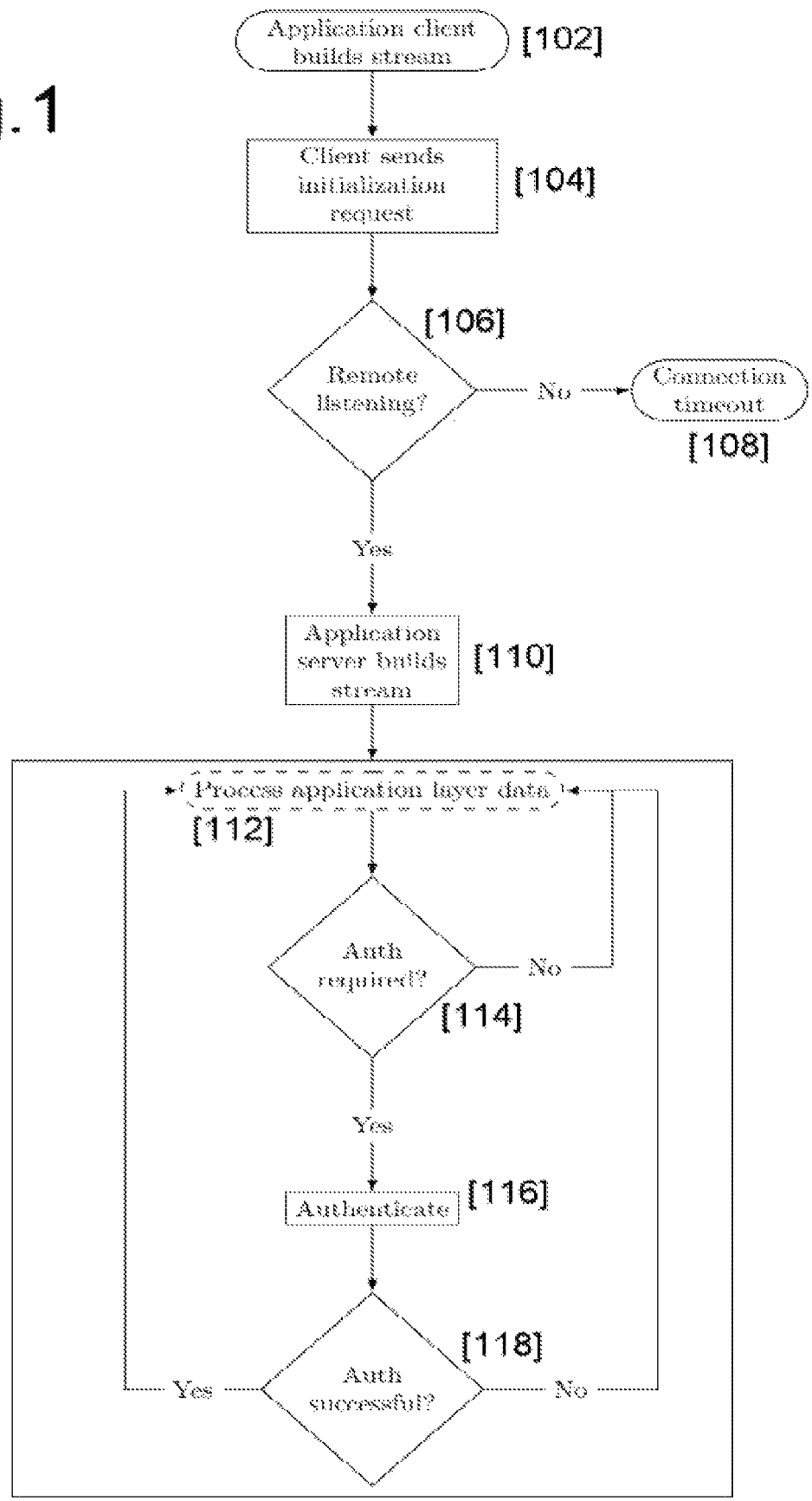
FIG. 1 illustrates a prior art data stream session management.

FIG. 1 represents a generalized view of the prior art for establishing data stream connections and processing user data. In the prior art protocol illustrated, a client first attempts to establish a stream with the server application 106. If the connection is successful, the server immediately begins processing user data 112. The server must process user data in order to determine whether an identity is required for the particular request being processed 112, whether an identity is present in the data, and whether that identity will be authorized for subsequent operations. Because the data is processed before an identity is established, the full content of the user data is not associated with an identity. It is this processing prior to authentication that grants access to vulnerabilities for exploitation anonymously.

Figure 2:
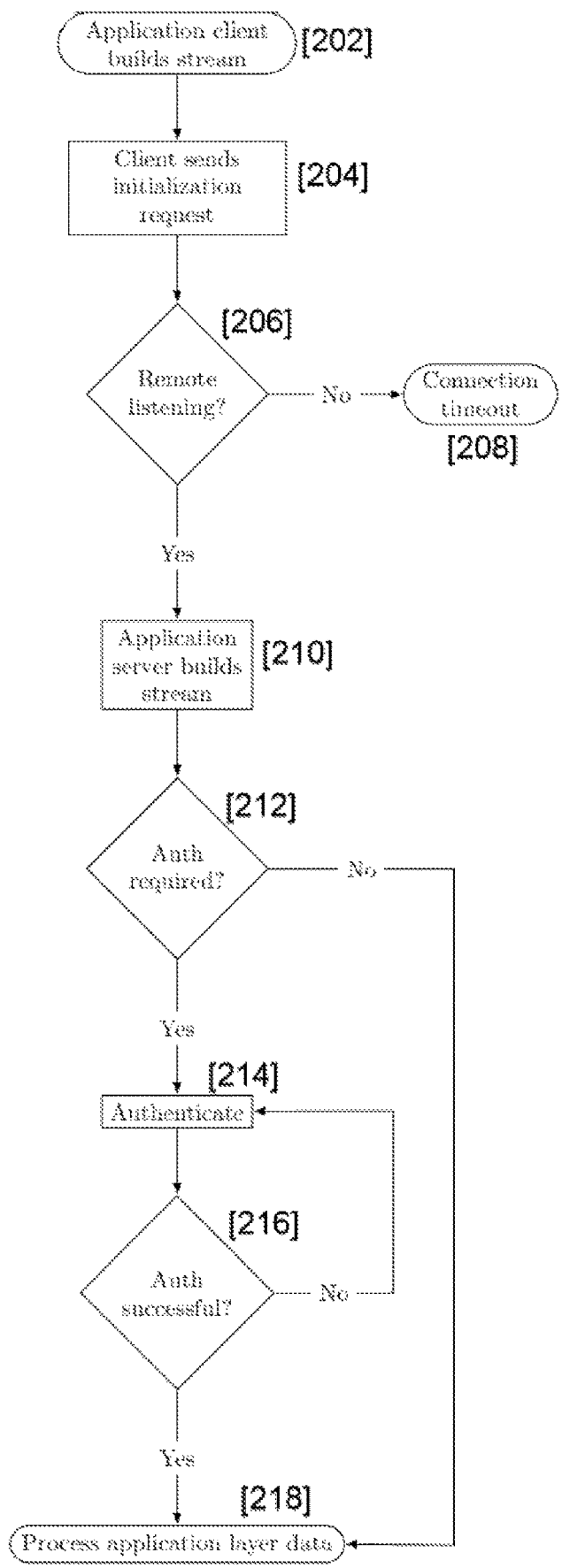
FIG. 2 illustrates an embodiment of inventive data stream session management protocol.

FIG. 2, by comparison, shows the inventive protocol takes active steps to identify and authenticate a data stream prior to data being processed by server. The protocol ensures application data is processed after an identity is established 214, 216, 218, and because of this, it will also ensure that all subsequent data can be associated with a specific identity. Further shown in FIG. 2, the application client builds the data stream and the client sends an initialization request. If the remote system is not listening, the connection will time out 208. If the remote system is listening, the application server builds the data stream 210, but the listening system will analyze the data stream to see if authentication is required 214 for this particular data stream or application. If authentication is not required, the data stream application layer data is processed by the receiving system 212. If authentication is required 212, an authentication request will be sent back to the sending system to provide appropriate authentication credentials 214. If successful, the receiving system will authenticate the credentials and allow access to process application layer data 218. If authentication is not successful, the receiving system will request additional authentication or reject the data stream 216, 214.

The protocol employs a number of safeguards in the authentication process. A first safeguard is mechanical and takes advantage of the physical limitations for resource access guaranteed by computer systems. A resource is said to be available within a scope if the commands within the executing segment of code can use or manipulate the resource or access its memory addresses. Because processes relying on the protocol, such as the target server application, do not have a data stream resource or address assigned to the data stream resource until after the protocol has fully processed and completed, there is a guarantee that data from unauthenticated sources will not be processed by the target application.

A second safeguard is social and relies on the association of an identity with data that is being processed by the target server application. Because computers can aggregate resources and information into abstract structures, the information that is provided by protocol is not limited to the data stream itself. When authentication is complete, the identity of the remote user will be represented in the form of a secure string of bytes known as a token. The resource given to the receiving application will include the identity token alongside the data stream so that each transmission may be recorded with the identity for forensic investigation. This provides the ability to identify and address malicious activity directly associated with the identity token.

Figure 3:
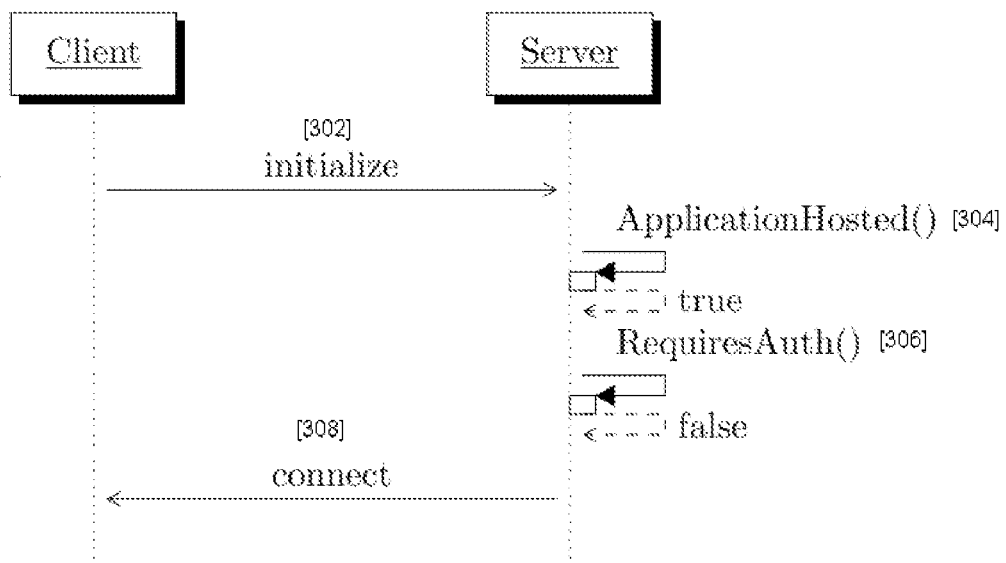
FIG. 3 illustrates a server determining that the requested application does not require authentication, and sending a message for the client to complete the connection.

FIG. 3 expands on the authentication process shown in FIG. 2 and demonstrates a connection for a target server application that does not require authentication. Because many applications hosted on the internet are intended for general public use, there must be a mechanism for protocol to complete connections without establishing an identity first. As further shown in the flow chart and steps of FIG. 3:

1. 302 Client agent sends a message to the server agent stating the intention to connect.
2. 304 Server agent determines that it is hosting the requested application.
3. 306 Server agent determines that the requested application does not require authentication.
4. 308 Server agent sends a message to the client agent stating that the connection may be completed.
5. Client and server agents both return a data stream resource or address to a data stream resource to client and server application.

Figure 4:
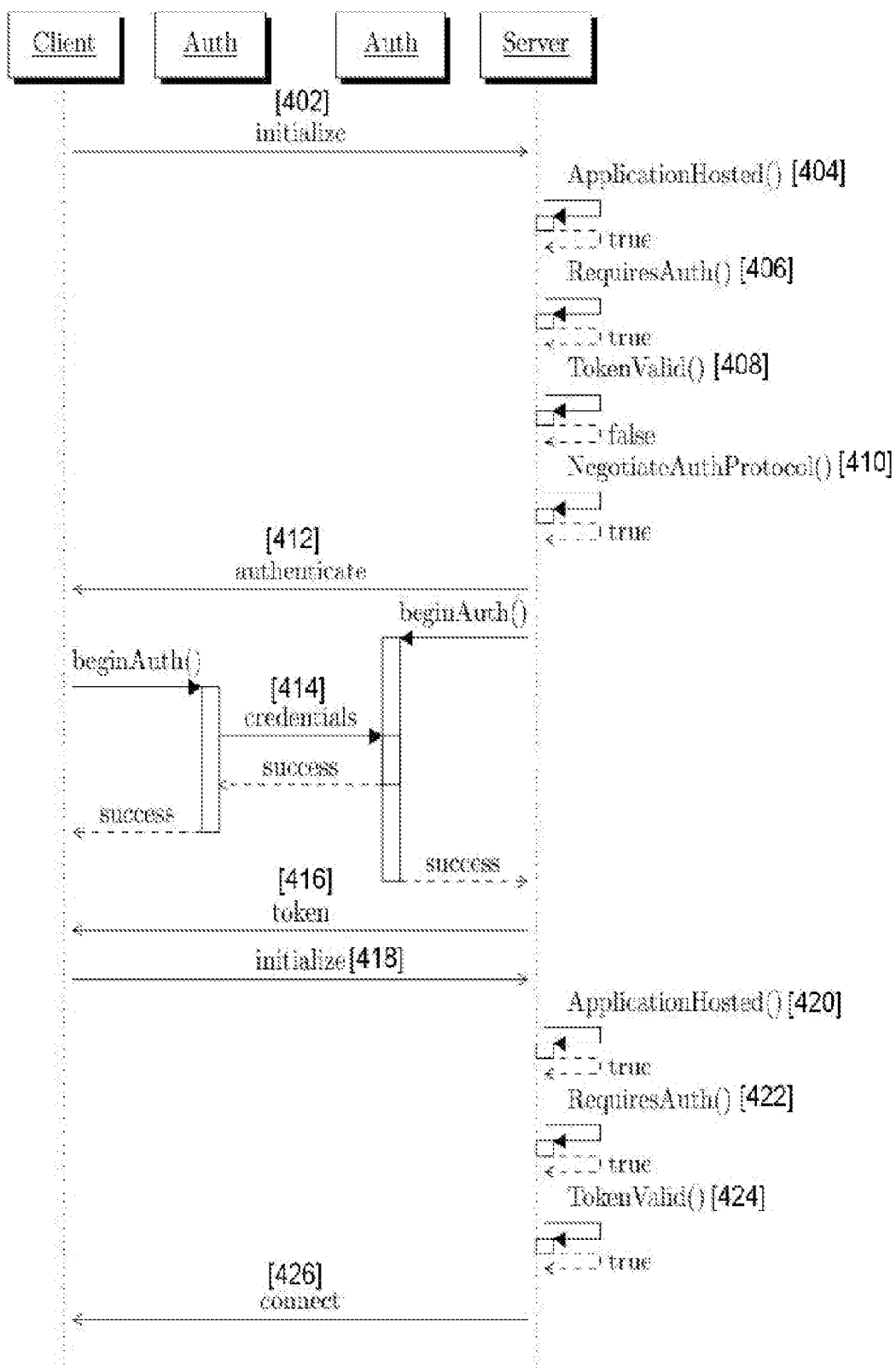
FIG. 4 illustrates a server determining that the requested application requires authentication, and coordinating and completing authentication.

FIG. 4 expands on the authentication process shown in FIG. 2 and demonstrates the process for a target server application that requires authentication. As further shown in the flow chart and steps of FIG. 4:

1. Client agent sends a message to the server agent stating the intention to connect 402.
2. Server agent determines that it is hosting the requested application 404.
3. Server agent determines that the requested applications require authentication 406.
4. Server agent determines that the client has not provided valid identity tokens 408.
5. Server agent negotiates a commonly shared authentication protocol 410.
6. Server agent sends a message to the client stating that authentication must be completed 412.
7. Client agent and server agent complete authentication 414.
8. Server agent sends a message containing the client's identity token 416.
9. Client agent sends a message to the server stating the intention to connect, this time including identity tokens received in step 7 418.
10. Server agent determines that it is hosting the requested application 420.
11. Server agent determines that the requested applications require authentication 422.
12. Server agent determines that the client provided valid identity tokens 424.
13. Server agent sends a message to the client agent stating that the connection may be completed 426.

14. Client and server agents both return a data stream resource or address to a data stream resource to client and server applications.

Because the process demonstrated in FIG. 4 is essentially the same process executed twice, beginning again on step eight but with different identity tokens, additional scenarios are possible that involve procuring and storing or transferring identity tokens.

Figure 5:
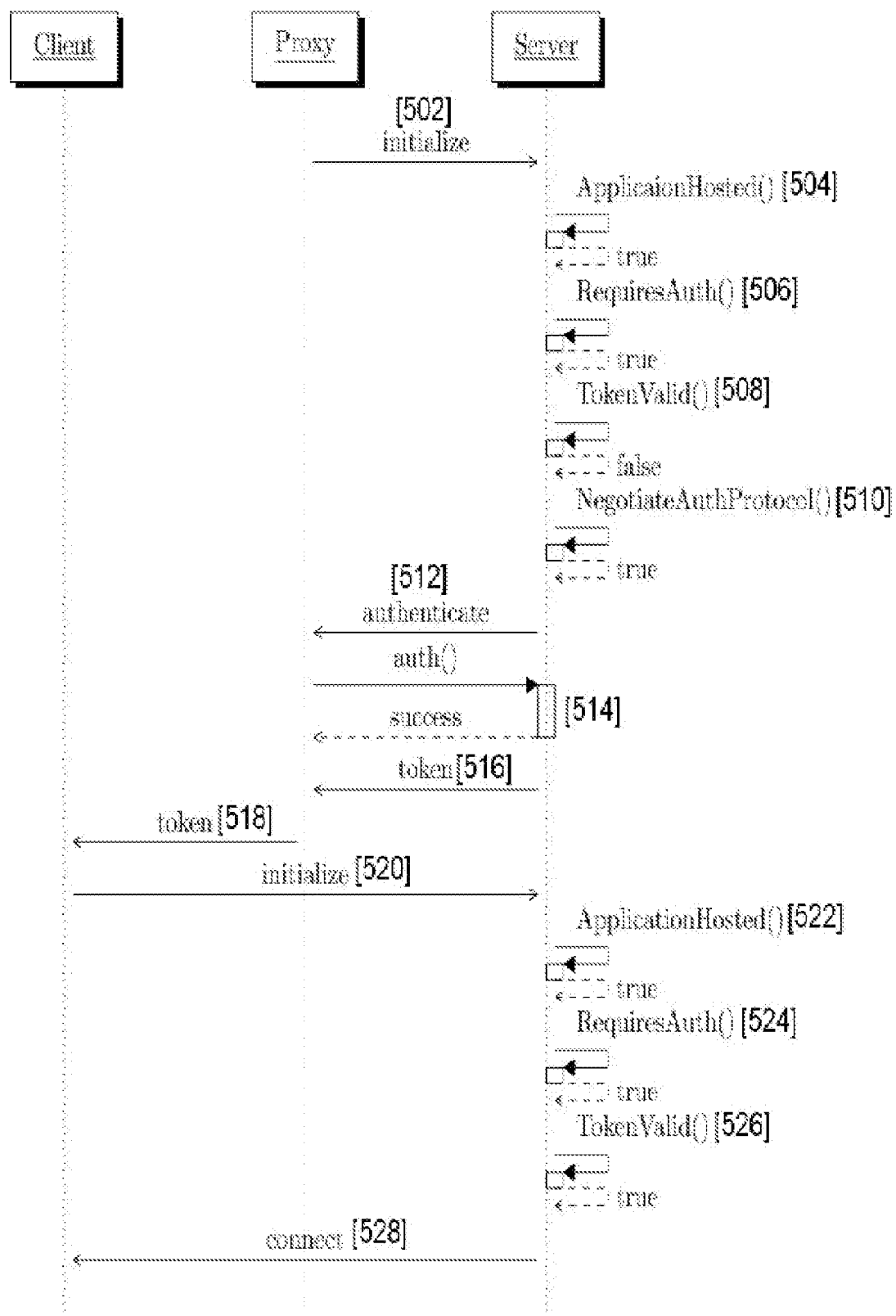
FIG. 5 illustrates authentication by proxy.

FIG. 5 demonstrates another aspect of the protocol that is authentication by proxy. The process of FIG. 4 is completed by two different clients. The proxy client completes step one through eight 502-516 as described for FIG. 4, transfers the token to a tertiary client 518, and the tertiary client completes steps nine through thirteen 520-528 as described for FIG. 4.

Figure 6:
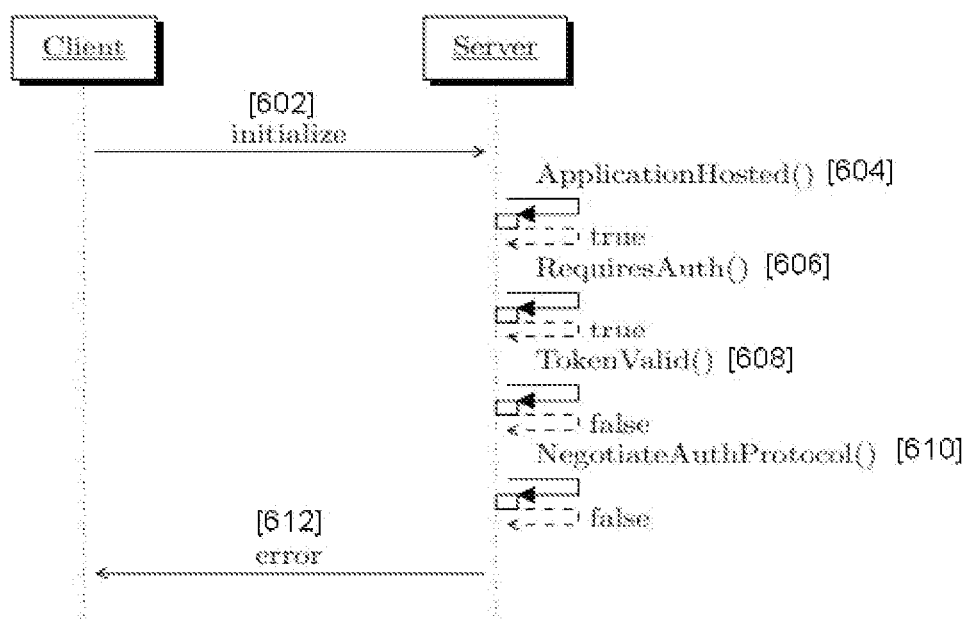
FIG. 6 illustrates authentication protocol negotiation failure.

FIG. 6 demonstrates failure to negotiate a mutually supported authentication protocol. In this case, the server agent is unable to find an authentication protocol supported by both the server and the client 610 using a list of supported protocols as provided in the initialize message and a list of protocols known to the server agent to be supported by the server application. An error message is sent as a response 612.

Figure 7:
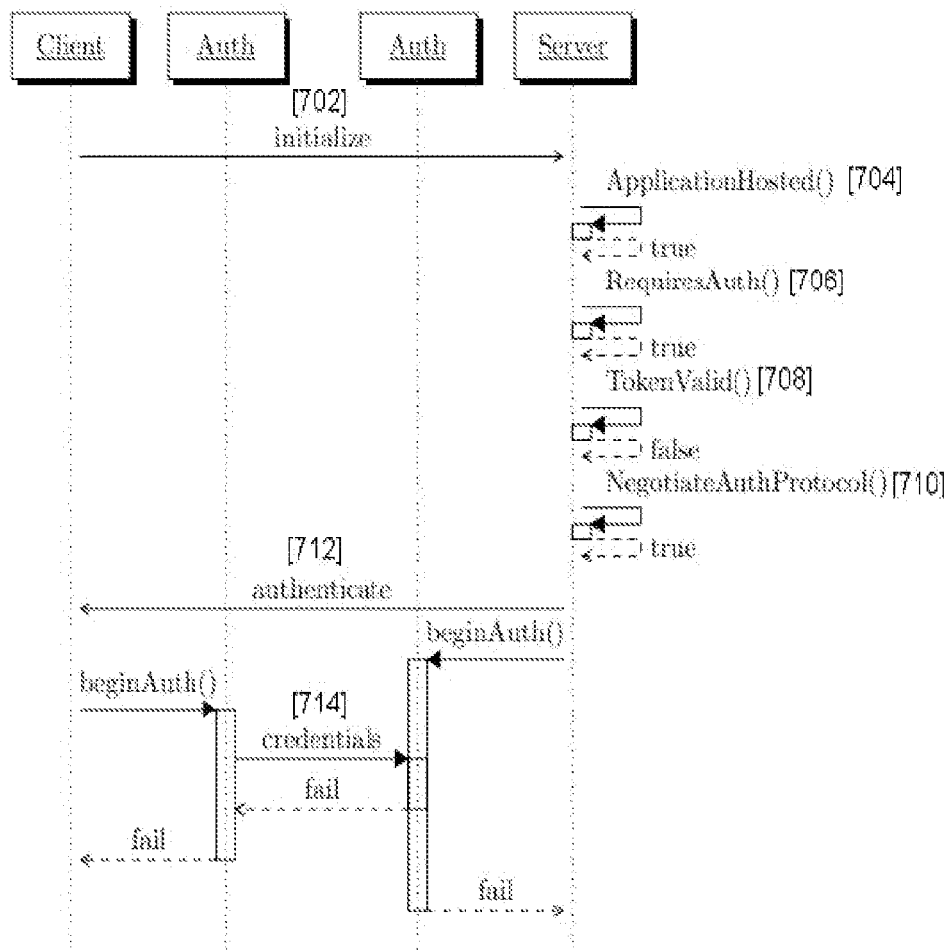
FIG. 7 illustrates authentication failure.

FIG. 7 demonstrates an authentication failure. In this case, the authentication protocol is successfully negotiated 710, but the client fails at authentication according to the selected protocol 714.

Figure 8:
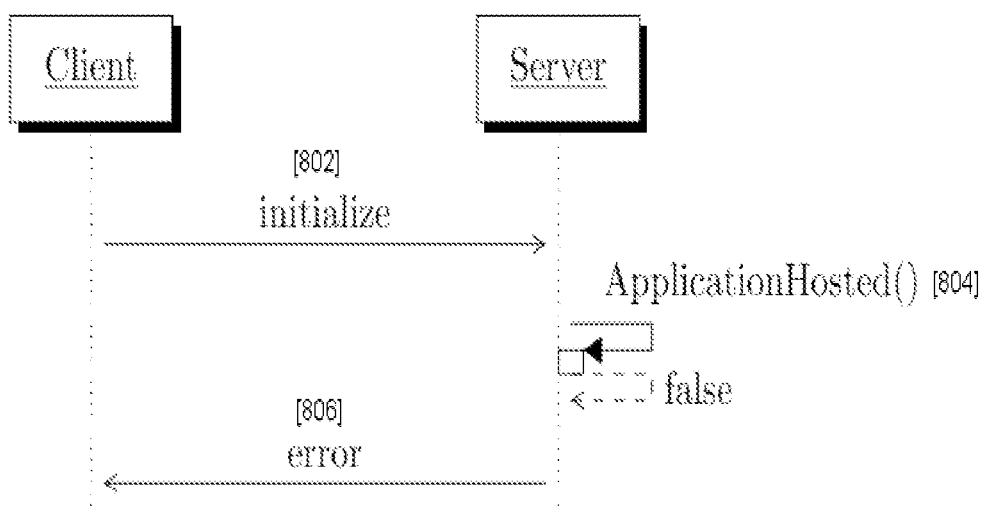
FIG. 8 illustrates application not hosted error.

FIG. 8 demonstrates a case when the sending agent is attempting to establish a connection to an application that is not hosted by the receiving agent 804 and the receiving agent replies with an error message 806.

Figures 9, 10, 11, 12:
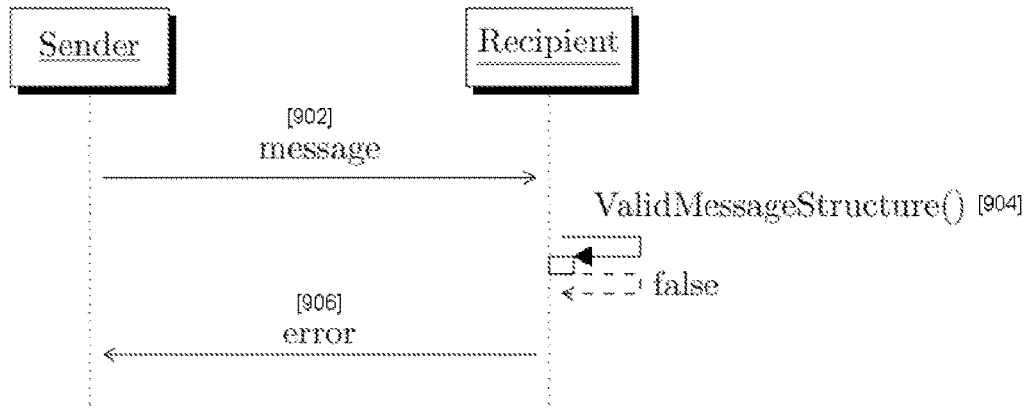
FIG. 9 illustrates invalid data structure error.
FIG. 10 illustrates an initialize message.
FIG. 11 illustrates a connect message.
FIG. 12 illustrates an authenticate message.

FIG. 9 demonstrates validation of message data structure. In this case, the sender may be the sending or receiving agent and the recipient may be the sending or receiving agent. The recipient determines that the message data structure is invalid 904 and replies with an error message 906.

FIG. 10 demonstrates the initialization message. One embodiment sends a message from client to server, and it may comprise the following data for these purposes:
    message 1002
        "initialize"
            Informs the server that the client intends to connect
    authentication-["<protocol>", "<protocol>"] 1004
        An array of protocol names identifying which authentication protocols the client is capable of.
    streams 1006
        An array of sets of data describing the desired target server application and the identity of the client.
    application 1008
        "<application>"
            The name of the target server application.
    token 1010
        <token>"
            An identity token formatted as a byte string for authentication specific to the associated application.

FIG. 11 demonstrates the connect message. The protocol sends this message from server to client, sends one connect message per application, and sends each over a unique data stream to ensure that each stream is used for the same purpose by client and server. The message comprises the following data for these purposes:
    message 1102
        "connect"
            Instructs the client to complete the data stream connection for the client application
    application 1104
        "<application>"
            The name of the target server application for a which a connection is being established.

FIG. 12 demonstrates the authenticate message. The protocol sends this message from server to client, and it contains the following data for these purposes:
    message 1202
        "authenticate"
            Informs the client to complete an authentication process
    protocol 1204
        "<protocol>"
            The name of the protocol that client and server will use to complete authentication.

FIG. 13 demonstrates the token message. The protocol sends this message from server to client, and it contains the following data for these purposes:
    message 1302
        "token"
            Informs the client that authentication was successful and provides a valid identity token for each application requested.
    streams 1304
        An array of sets of data describing the target server application and the identity token to be used by the client for that application.
    application 1306
        "<application>"
            The name of the target application for which the associated token is to be used
    token 1308
        "<token>"
            An identity token formatted as a byte string FIG. 14 demonstrates the error message, and it contains the following data for these purposes:
    message 1402
        "error"
            Informs the receiving system that an error has occurred
    error 1404
        Human readable description of the error Those of ordinary skill in the art will understand and appreciate the aforementioned description of the invention has been made with reference to a certain exemplary embodiment of the invention, which describe a data stream authentication protocol and method of use. Those of skill in the art will understand that obvious variations in construction, material, dimensions or properties may be made without departing from the scope of the invention which is intended to be limited only by the claims appended hereto.

The invention claimed is:

1. A method of transmitting data through a data stream between a sending application having a sending agent and a receiving application having a receiving agent comprising the steps of:
    the sending agent sending a message to the receiving agent stating an intention to establish a data stream, specifying the receiving application as a target application, and the sending agent enumerating authentication protocols supported by the sending agent, wherein the message includes either an invalid identity token or is missing an identity token;
    the receiving agent determining that the target application is the application served by the receiving agent;
    the receiving agent determining that the application data stream requires authentication;

the receiving agent determining that there is an invalid identity token or missing identity token;

the receiving agent determining an authentication protocol that is mutually supported by the receiving agent and the sending agent;

the receiving agent sending an authentication requirement message to sending agent, indicating the authentication protocol to be used to establish sending agent identity;

the sending agent adds invalid or missing authentication credentials to the data stream using the authentication protocol;

the receiving agent rejecting the credentials using the authentication protocol; and the sending agent and receiving agent aborting the connection attempt.

2. The method of transmitting data through a data stream of claim 1 wherein the steps of the sending agent sending a message to the receiving agent stating the intention to connect, specifying the receiving application as the target application, and the sending agent enumerating authentication protocols supported by the sending agent further comprises the step of initiating a connection to the receiving agent.

3. The method of transmitting data through a data stream of claim 2 wherein the steps of the receiving agent determining that the specified target application is the application served by the receiving agent, the receiving agent determining that the application data stream requires authentication, the receiving agent determining that the identity token provided by the sending agent is invalid or missing, and receiving agent selecting a mutually supported authentication protocol according to what is enumerated by the sending agent and supported by the receiving agent comprise the steps of authentication protocol negotiation.

4. The method of transmitting data through a data stream of claim 3 wherein the steps of the receiving agent sending a message to the sending agent indicating the negotiated authentication protocol and the requirement to authenticate comprise the steps of initiating authentication.

5. The method of transmitting data through a data stream of claim 4, the sending agent adding invalid or missing authentication credentials to the data stream according to the negotiated authentication protocol, and the receiving agent determining that the credentials are invalid or missing according to the negotiated authentication protocol comprise the steps of authentication failure.

* * * * *